United States Patent [19]

Meehan, deceased et al.

[11] 3,939,323

[45] Feb. 17, 1976

[54] SHIELDING GAS FOR LASER WELDING

[75] Inventors: Richard J. Meehan, deceased, late of Mamaroneck, N.Y., by Linda B. Meehan, administratrix; Richard H. Rein, Millwood; Ralph H. Willgohs, Yorktown Heights, both of N.Y.

[73] Assignee: Union Carbide Corporation, New York, N.Y.

[22] Filed: Aug. 13, 1974

[21] Appl. No.: 497,124

Related U.S. Application Data

[63] Continuation of Ser. No. 288,938, Sept. 14, 1972, abandoned.

[52] U.S. Cl. .......................................... 219/121 LM
[51] Int. Cl.² .......................................... B23K 26/00
[58] Field of Search ................... 219/121 L, 121 LM

[56] References Cited
FOREIGN PATENTS OR APPLICATIONS 1,903,325   6/1971   Germany ...................... 219/121 L

OTHER PUBLICATIONS

Locke et al., "Deep Penetration Welding with High-Power $CO_2$ Lasers", *IEEE Journal of Quantum Electronics*, Vol. QE-8, No. 2, 2/1972.

*Primary Examiner*—J. V. Truhe
*Assistant Examiner*—Clifford C. Shaw
*Attorney, Agent, or Firm*—Eugene Lieberstein

[57] ABSTRACT

Helium and helium base gas mixtures such as helium-hydrogen; helium-oxygen and helium-carbon dioxide have been found to improve weld penetration when used with presently available lasers to weld most steels.

3 Claims, 2 Drawing Figures

EFFECT OF TRAVEL SPEED AND SHIELD GAS COMPOSITION ON DEPTH OF PENETRATION IN 304 S.S.

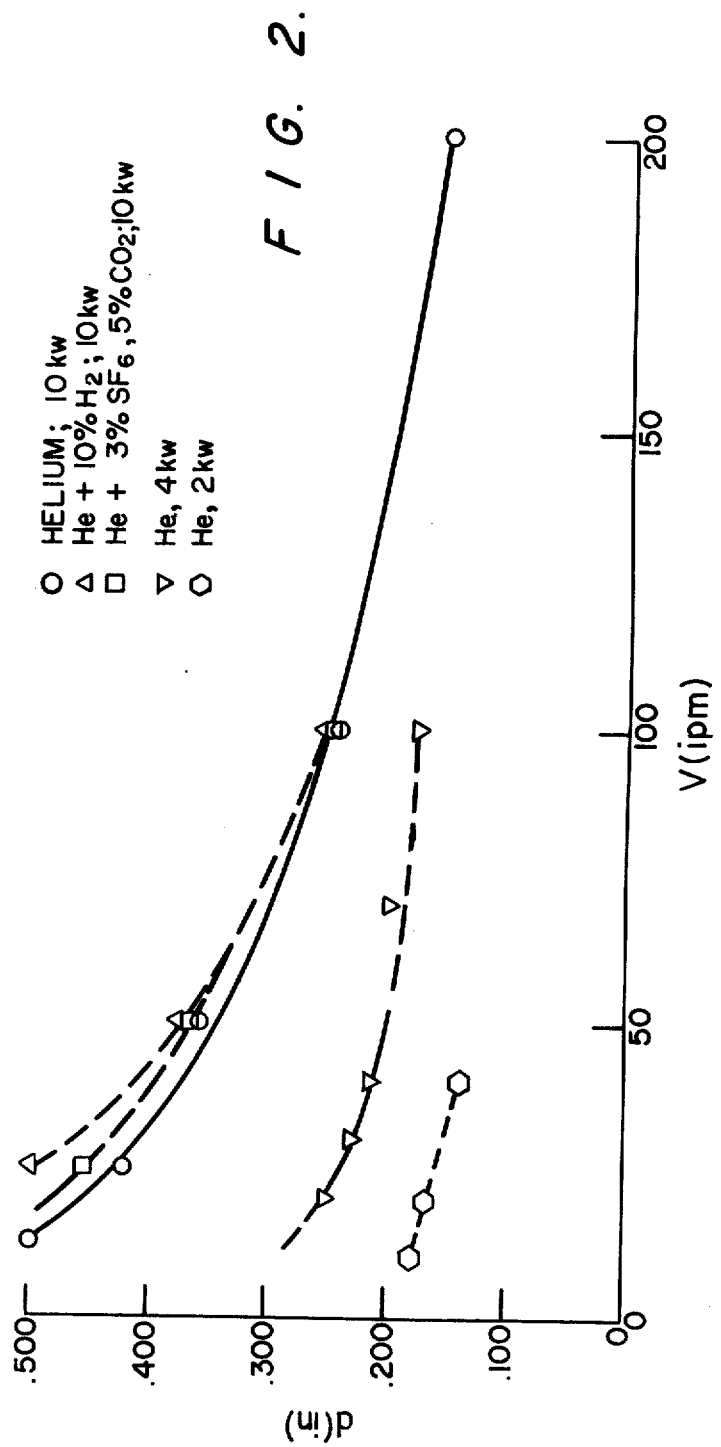

SHIELDING GAS FOR LASER WELDING

This is a continuation of application Ser. No. 288,938, filed Sept. 14, 1972, now abandoned.

This invention relates to shielding gas compositions for laser welding and, more particularly, to shielding gas compositions for use when laser welding steels such as carbon steels, stainless steels and most alloy steels.

Although welding has been recognized as one of the major potential users of laser beams since the early sixties, lasers have had only minor impact on welding technology to date. Due to the low continuous wave power levels available, commercial application have been in areas where the more conventional processes are not easily applied. However, the recent development of higher powered gas lasers promises to have a profound effect on the importance of the laser as a welding tool. At the present time several companies have developed high powered lasers with power outputs of up to about 10 to about 20 KW.

It was unexpectedly discovered that when welding with a high powered laser in the power output range of from about 2 to about 10 KW, argon could not successfully be used to shield the weld puddle. When argon gas was used as the shielding gas, a large luminous plasma plume occurred above the weld zone in the path of the incident laser beam. The presence of such plasma plume indicated a lower utilization of laser power and a lower depth of penetration.

It is theorized that the plasma plume is associated with the presence of easily ionizable metal atoms and free electrons from thermionic emission or thermal ionization of the metal vapor. The free electrons would be heated rapidly by the high electric field near the laser focus and, if not quenched by the shield gas, would attain energy levels high enough to ionize the metal atoms and sustain the plasma plume.

It was rationalized then that penetration should increase with increasing thermal conductivity of the shield gas and it should be enhanced by the presence of an electronegative specie to remove the free electrons.

Accordingly, it is the main object of this invention to provide a shielding gas medium suitable for use in laser welding.

A further object is to provide such a shielding medium for use when laser welding steels such as carbon steel, stainless steel and most alloy steels.

These and other objects will be pointed out or become apparent from the following description and drawings wherein:

FIG. 2 shows the results obtained with helium base gas mixtures.

Figure 1:
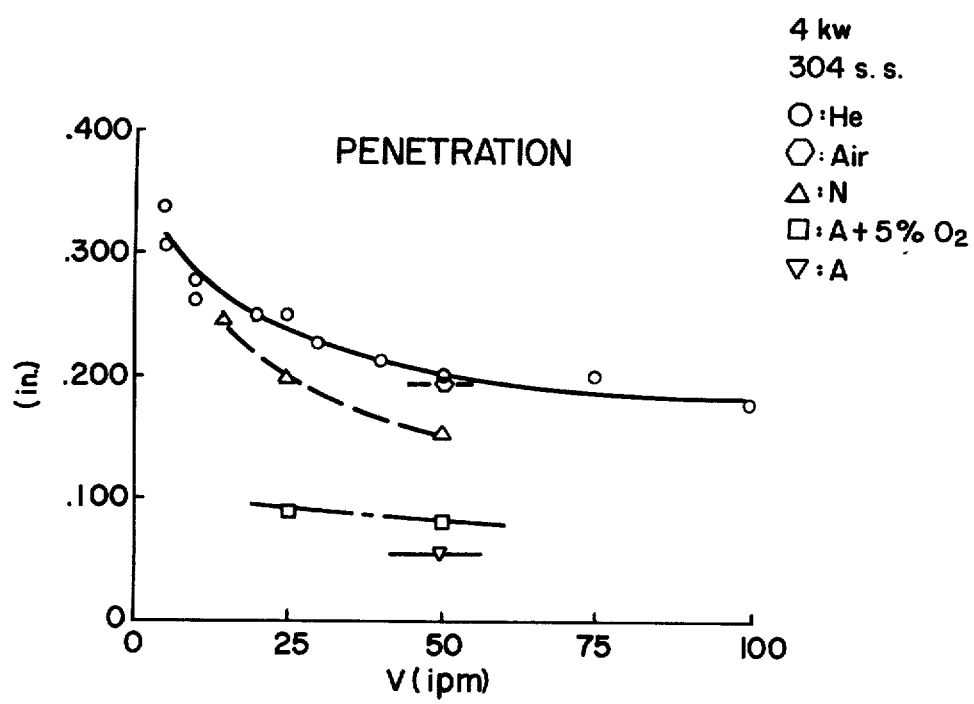
FIG. 1 shows the results obtained with different shielding medium.

As can be seen from FIG. 1, helium gas was found to be far superior to argon, argon + 5% oxygen, nitrogen and air, although air was far better than argon.

As can be seen from FIG. 2, penetration was improved over pure helium by the addition of hydrogen and other additives such as oxygen base gases, some fluoride gases such as $CCl_2F_2$ (Dichlorodifloromethane) and $SF_6$ (Sulfur hexafluoride).

Based on the experimental data presently available which was obtained by making bead on plate welds in carbon steels, stainless steel, some high strength alloy steels, it was found that with a 10 KW laser beam and helium shielding, full penetration in a ½ inch thick workpiece could be obtained at a travel speed of 12.5 in/min. Penetration of 0.43 in. was obtained at 25 in/min. and 0.24 in. at 100 in/min.

Penetration was improved by adding 10% hydrogen to the helium with the following results also at 10 KW: 0.5 in. (full) penetration at 25 in/min. which is a 15% improvement in penetration or a doubling of travel speed. At 100 in/min. penetration increased slightly to 0.25 in.

Penetration also increased by the addition of oxygen, carbon dioxide, $CCl_2F_2$, and $SF_6$ to helium.

Generally, then it has been discovered that helium and helium base gas mixtures improve laser beam weld penetration in a steel workpiece.

More specifically, it has been found that helium and helium base gas mixtures increase laser beam penetration in a steel workpiece at travel speed up to about 100 in/min.

Depending on the metals being welded, certain mixtures will be preferred over others. For example, hydrogen causes embrittlement of some high strength steels, such as HY-180, so that a helium-hydrogen mixture will not be useful for laser welding such materials.

The upper limit of $H_2$ and $O_2$ additives to the $H_e$ shielding gas will be determined by the onset of porosity, cracking or by the excessive oxidation of the alloy resulting in unacceptable mechanical properties. The precise limit of additives, which brings about the above-mentioned conditions, varies with the welding conditions (travel speed, energy input, laser spot size), the joint configuration, the composition of the alloy being welded and whether or not filler metal is added. Thus, it is not possible to specify exact limits. It is believed that under some conditions the additive concentration may be in excess of 50%, while under different conditions it will be only several tenths of a percent.

We claim:

1. A method for deep penetration welding of metallic workpieces with a laser beam which comprises directing said beam to the workpiece and shielding the weld zone with a shielding gas consisting essentially of a mixture of helium and less than 20% by volume of an electronegative gas.

2. A method for deep penetration welding of metallic workpieces with a laser beam which comprises directing said beam to the workpiece and shielding the weld zone with a shielding gas consisting essentially of a mixture of helium and at least one other gas which will in combination provide a higher thermal conductivity than helium alone.

3. A method for deep penetration welding of metallic workpieces with a laser beam which comprises directing said beam to the workpiece and shielding the weld zone with a shielding gas consisting essentially of a mixture of helium, an electronegative gas and up to 10% by volume of $CO_2$.

* * * * *